United States Patent [19]
Evans et al.

[11] Patent Number: 5,918,267
[45] Date of Patent: Jun. 29, 1999

[54] LEAK DETECTION

[75] Inventors: Owen Daniel Evans; Patrick K. Mumme, both of Tucson, Ariz.

[73] Assignee: Raychem Corporation, Menlo Park, Calif.

[21] Appl. No.: 08/868,906

[22] Filed: Jun. 4, 1997

[51] Int. Cl.[6] .................................................. G01M 3/18
[52] U.S. Cl. ..................... 73/40.5 R; 73/49.1; 174/11 R; 340/605
[58] Field of Search ............................... 73/40.5 R, 49.1, 73/47.2, 49.5; 340/605; 174/11 R

[56] References Cited

U.S. PATENT DOCUMENTS

| | | | |
|---|---|---|---|
| 4,487,057 | 12/1984 | Lutz | 73/40.5 R |
| 4,844,287 | 7/1989 | Long | 73/49.2 X |
| 4,922,232 | 5/1990 | Bosich | 73/49.2 X |
| 4,974,739 | 12/1990 | Gelin | 73/49.2 |
| 4,989,447 | 2/1991 | Gelin | 73/49.2 |
| 5,172,730 | 12/1992 | Driver | 73/49.1 X |
| 5,176,025 | 1/1993 | Butts | 73/40.5 R |

*Primary Examiner*—Daniel S. Larkin
*Attorney, Agent, or Firm*—Timothy H.P. Richardson; Herbert G. Burkard

[57] ABSTRACT

A system for detecting leaks from buried pipes which transport fluids other than water. The system includes a pipe for transporting the fluid, a fluid-wicking member which lies beneath the pipe, is wetted by the fluid when the fluid leaks from the pipe, and is permeable to water, and a fluid sensor which contacts the fluid-wicking member and is capable of detecting the fluid.

14 Claims, 1 Drawing Sheet

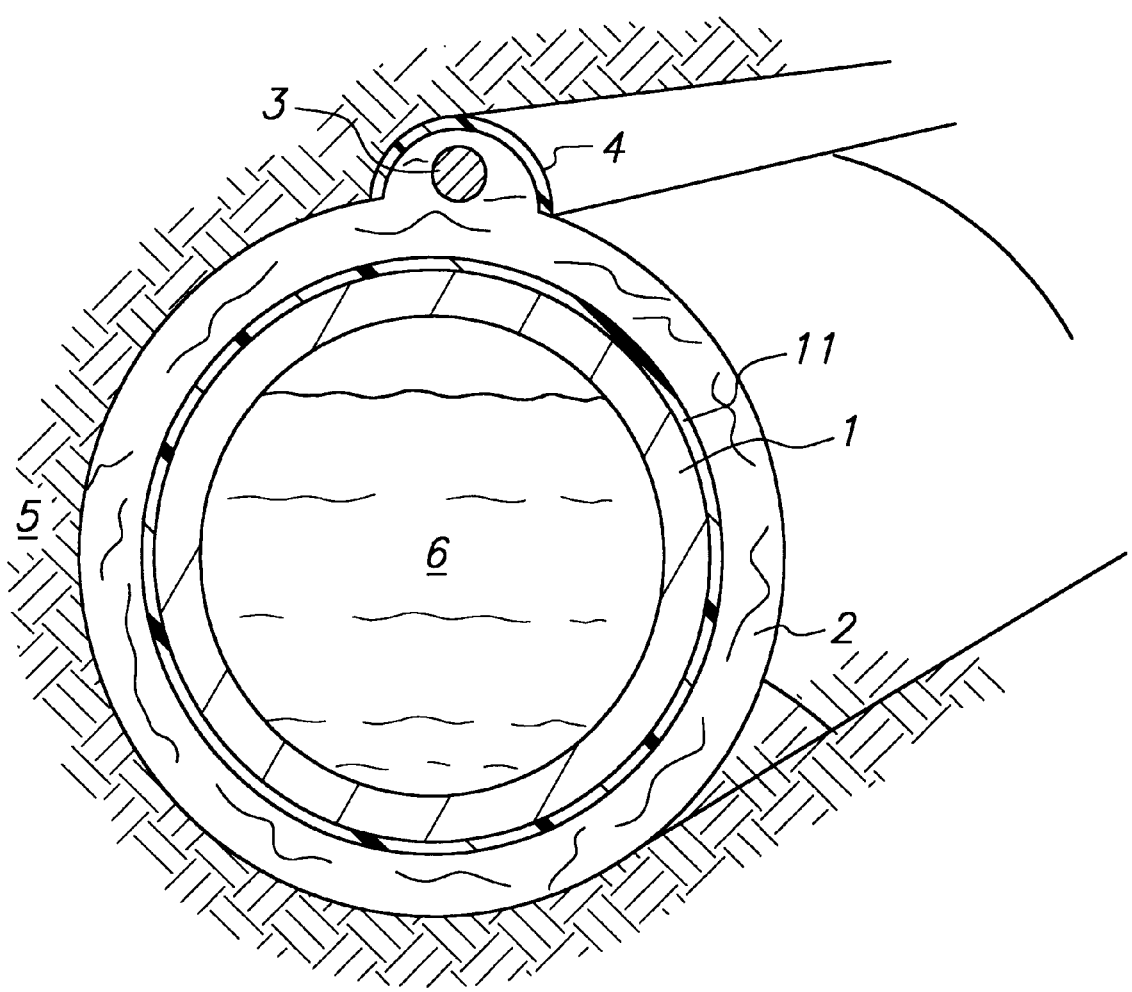

LEAK DETECTION

BACKGROUND OF THE INVENTION

1. Field of the Invention

This invention relates to the detection of leaks from buried pipes.

2. Introduction to the Invention

It is well known that there is a need to prevent leaks from buried pipes, to detect such leaks if they occur, and, if possible, to contain such leaks when the fluid is harmful to the environment, e.g. is a hydrocarbon. A very common way of preventing corrosion of metal pipes is by means of cathodic protection systems, and these require that when the soil is wet, there is a continuous electrical path from the cathode to the pipe. Many systems have been proposed for detecting leaks, including those disclosed in U.S. Pat. Nos. 4,843,327 (Koppitsch et al.), 4,862,146 (McCoy et al.), 4,922,183 (Kamas), 4,926,129 (Wasley et al.), 4,926,165 (Lahlouh et al.), 4,931,741 (Koppitsch et al.), 5,015,958 (Masia et al.), 5,101,657 (Lahlouh et al.), 5,191,292 (Klotz et al.), 5,235,286 (Masia et al.), and 5,382,909 (Masia et al.), the disclosures of which are incorporated herein by reference for all purposes. However, when such leak detectors are placed adjacent to a directly buried pipe, absorption of the leaking fluid by the soil can render the system ineffective. In order to ensure that a sufficient amount of the leaking fluid contacts the leak detector to activate the system (and in order to contain the leaking fluid), double containment systems have been used. However, double containment systems are slow and expensive to install, and interfere with cathodic protection systems.

SUMMARY OF THE INVENTION

We have discovered a new system for detecting leaks from pipes which transport fluids other than water. The system is easy and relatively cheap to install, provides effective leak detection, and does not interfere with cathodic protection of the pipe. Thus, the invention provides a buried pipe system for transporting a fluid, the system comprising:

1) a pipe for transporting a fluid which is not water;
2) a fluid-wicking member which
   (i) lies beneath the pipe,
   (ii) is wetted by said fluid when any of said fluid leaks from the pipe, and
   (iii) is permeable to water; and
3) a fluid sensor which
   (i) contacts the fluid-wicking member, and
   (ii) is capable of detecting said fluid.

BRIEF DESCRIPTION OF THE DRAWING

The invention is illustrated in the accompanying drawing, in which the FIGURE illustrates a system of the invention.

DETAILED DESCRIPTION OF THE INVENTION

The invention can be used to detect leakage of fluid from any type of pipe, but is particularly useful when the pipe is a metal pipe which is protected from corrosion by a cathodic protection system. Such metal pipes are often covered by a protective layer of water-impermeable material, so that the cathodic protection system is needed only to protect those parts of the pipe which are exposed as a result of damage to the protective layer.

The fluid carried by the pipe can be any fluid other than water which will activate the fluid sensor, but the invention is particularly useful when the fluid is a hydrocarbon.

The fluid wicking member conveys leaking fluid to the fluid sensor. Preferably the fluid-wicking member runs the entire length of the pipe, so that a leak at any point is conveyed to the sensor. If, as is preferred, the fluid sensor is at the top of the pipe, the fluid wicking member preferably covers substantially all (e.g. at least 90%) of the pipe surface. The fluid wicking member is preferably a fabric, particularly a non-woven fabric, which is wrapped around the pipe (either as a spiral wrap or a cigarette wrap). The material of the wicking member should be selected so that it is wetted by (but not damaged by) the leaking fluid, is not damaged by continuous contact with wet soil, and is rugged enough not to be damaged while the pipe is being installed. Preferably the fabric comprises fibers of a synthetic polymer, e.g. a polyolefin. Suitable fabrics include those which are used in systems for containing spills, e.g. oil spills.

The fluid sensor can be any of the known sensors for detecting the leaking fluid, including those described in the documents incorporated by reference herein. Preferably, the fluid sensor is a continuous sensor cable. The fluid sensor can be placed at any point, but generally the sensor, the wicking member and the pipe will be in contact with each other, with the wicking member preferably being between the pipe and the sensor. Particularly for ease of installation, the sensor is preferably positioned on top of the pipe and follows a path parallel to the pipe.

The system preferably includes a rigid cover member, e.g. half of a plastic pipe, which covers the sensor member. This protects the sensor from damage by the soil, particularly when the pipe is being back filled. The cover member can also provide a passageway which is large enough to permit a sensor cable to be put in place after the pipe has been laid, and/or to permit an existing sensor cable to be replaced by a new sensor cable.

Referring now to the drawing, the FIGURE shows a pipe 1 having a water-impermeable coating 11. A fluid wicking member 2 is provided by a non-woven fabric wrapped around pipe 1. A fluid sensor cable 3 runs along the top of the pipe, and is covered by cover member 4. These components 1, 2, 3, and 4 are buried in soil 5, and the pipe contains hydrocarbon fluid 6.

What is claimed is:

1. A buried pipe system for transporting a fluid, the system comprising:

1) a pipe for transporting a fluid which is not water;
   2) a fluid-wicking member which
      (i) lies beneath the pipe,
      (ii) is wetted by said fluid when any of said fluid leaks from the pipe,
      (iii) is permeable to water, and
      (iv) is in direct contact with soil surrounding the pipe; and
   3) a fluid sensor which
      (i) contacts the fluid-wicking member, and
      (ii) is capable of detecting said fluid.

2. A system according to claim 1, wherein said fluid is a hydrocarbon.

3. A system according to claim 2, wherein the fluid-wicking member is a fabric.

4. A system according to claim 3, wherein the fabric is wrapped around the pipe.

5. A system according to claim 3, wherein the fabric is a non-woven fabric.

6. A system according to claim 3, wherein the fabric comprises fibers composed of a synthetic polymer.

7. A system according to claim 6, wherein the synthetic polymer is a polyolefin.

8. A system according to claim 1, wherein the fluid sensor is a continuous sensor cable.

9. A system according to claim 8, wherein the fluid-wicking member is a fabric which is wrapped around the pipe and lies between the pipe and the sensor cable.

10. A system according to claim 8, wherein the sensor cable follows a path parallel to the pipe.

11. A system according to claim 10, wherein the sensor cable runs along the top of the pipe.

12. A system according to claim 11, which comprises a rigid cover member which covers the sensor cable and provides a passageway which is large enough to enable the sensor cable to be withdrawn from the passageway and replaced by another sensor cable.

13. A system according to claim 12, wherein the pipe is a metal pipe which is protected from corrosion by a cathodic protection system.

14. A system according to claim 1, wherein the pipe is a metal pipe which is protected from corrosion by a cathodic protection system.

* * * * *